United States Patent [19]

Petrzelka et al.

[11] 4,412,827
[45] Nov. 1, 1983

[54] UNIVERSAL JOINT

[75] Inventors: Miloslav Petrzelka, Much-Kranüchel; Herbert Taureg, Hennef, both of Fed. Rep. of Germany

[73] Assignee: Uni-Cardan AG, Siegburg, Fed. Rep. of Germany

[21] Appl. No.: 172,362

[22] Filed: Jul. 18, 1980

[30] Foreign Application Priority Data

Aug. 18, 1979 [DE] Fed. Rep. of Germany ....... 2933505

[51] Int. Cl.$^3$ .............................................. F16D 3/26
[52] U.S. Cl. .................................. 464/128; 464/132; 464/136
[58] Field of Search ................... 464/128, 132, 136

[56] References Cited

U.S. PATENT DOCUMENTS

| | | | |
|---|---|---|---|
| 1,194,224 | 8/1916 | Perkins | 464/132 |
| 1,845,794 | 2/1932 | Jeffrey | 464/136 |
| 1,997,488 | 4/1935 | Henry | 464/132 |
| 3,216,087 | 11/1965 | Harrington | 464/132 |
| 3,886,766 | 6/1975 | Selmek | 464/136 |
| 3,950,834 | 4/1976 | Pitner | 464/128 |
| 4,129,016 | 12/1978 | Olson, Sr. | 464/128 |

FOREIGN PATENT DOCUMENTS

| | | |
|---|---|---|
| 232392 | 3/1964 | Austria . |
| 1827229 | 2/1961 | Fed. Rep. of Germany . |
| 1122781 | 8/1962 | Fed. Rep. of Germany . |
| 2737557 | 2/1978 | Fed. Rep. of Germany . |
| 1217833 | 5/1960 | France . |

Primary Examiner—Ira S. Lazarus
Attorney, Agent, or Firm—Toren, McGeady and Stanger

[57] ABSTRACT

In a universal joint having a trunnion cross including trunnions defining a centerline extending centrally therethrough and trunnion cross support members which include a yoke defining a yoke bore and a bearing bush received within the bore and receiving therein the trunnions, an improvement is provided in that the trunnion cross support members are formed with at least one conical surface configured to taper away from a plane containing the centerline of the trunnion in a direction outwardly from the center of the universal joint. Conical surfaces may be formed on opposite sides of the trunnion centerline to extend an angular distance circumferentially which is greater than twice the bending angle of the joint. The conical surfaces may be formed either on the walls of the yoke bore or on the bearing bush.

10 Claims, 5 Drawing Figures

UNIVERSAL JOINT

The present invention relates generally to the structure of a universal joint and more particularly to a joint which is composed of two yokes having supported in the bores of the yokes trunnion crosses with cylindrical trunnions with bearing bushes having cylindrical inner surfaces being arranged intermediately thereof.

In the prior art, for example German Pat. No. 1,122,781, universal joints are known wherein the bearing bushes are constructed in such a way that, in the no-load condition of the universal joint shaft, the bearing faces of the trunnions will not always be parallel to the bearing faces of the bearing bushes. This may result in a gap between the trunnion and the bush which increases in size from the center of the joint outwardly thereof. This gives rise to a disadvantage in that, when a conical trunnion is formed, its production, which is usually accomplished by a grinding process, becomes very difficult. Also, when a bush with conical internal surfaces is utilized, an undercut must be created which can only be produced under difficult circumstances.

It is further known from, for example German Offenlegungsschrift No. 2,737,557, that the load acting on a trunnion bearing may be divided among a number of the needles of the needle bearing means so that the bearing characteristics of the universal joint coupling will be improved and the operational service life may be extended. For this purpose, the trunnion is ground to be slightly eliptical so that a plurality of bearing needles will absorb the motive forces acting between the trunnions and the bearing bush. It is clearly obvious that, with this type of production, it also is difficult to provide on the trunnion a running surface which is perfectly eliptical.

In view of the foregoing, the invention is directed toward provision of a universal joint construction which is formed in such a way that optimum utilization of bearing capacity is achieved without causing additional expenses to arise.

SUMMARY OF THE INVENTION

The present invention may be briefly described as a universal joint construction which includes trunnion cross means having trunnions defining a centerline thereof extending centrally therethrough and trunnion cross support means which include yoke means defining yoke bore means and bearing bush means received within the yoke bore means and receiving therein the trunnion means. The invention is particularly directed to an improvement which comprises that the trunnion cross support means is formed with conical surface means interfacing between the bearing bush means and the yoke bore means, with the conical surface means, taken in a direction outwardly from the center of the universal joint, being formed to extend from radially inwardly to radially outwardly relative to a plane containing the centerline of the trunnion means.

Thus, the invention enables advantages to be achieved over the prior art in that, starting from the plane containing the centerline of the trunnions, either the bearing bush or the yoke bore in which the trunnion cross is received is formed with at least one conical surface which commences from radially inwardly of the center of the joint and extends radially outwardly thereof.

This embodiment of the invention has the advantage that, due to the change of the shape of the drive bosses of the joint at the inner diameter or of the bearing bush at the outer diameter, the elastic deformation of the bush under torque load is optimized.

In accordance with a further important embodiment, it is provided that when the surface is arranged in the bearing bush, this surface is arranged on the outer surface of the bearing bush so as to end on both sides of the circumference, wherein the surface radially inside has a greater distance from the center axis of the bush than that radially outside.

It is advantageous in this connection that the bearing bush be elastically deformable under the load resulting from the torque occurring in the joint and that it adjust to the drive boss of the joint at the inner diameter. In this manner, the load on the needle bearing is applied more uniformly over the entire length of the individual needles thereof. The result is an optimum utilization of bearing capacity or, in the case of maximum load, an extension of the surface life of the joint.

Elastic deformation of the bush under load conditions resulting from torque may be obtained in the same manner in accordance with another feature of the invention. In this feature, it is provided that, when the surface is arranged in the bore of the yoke, this surface is arranged in the surface of the bore toward both sides of the circumference, wherein the surface radially outwardly has a greater distance from the center axis of the bore than radially inwardly.

Since a single direction of rotation of the joint is not always provided and since, in certain cases, it is also opposite rotation of the universal joint shaft which is desired, it is provided in accordance with another feature of the invention that two surfaces are provided which are arranged diametrically opposite each other.

In embodiments wherein the surface is arranged on the outer surface of the bearing bush, in order to simplify production by means for example of a shaping process which does not involve a cutting operation, it is provided that the surface is deformed with a radius which is greater than the radius of the outer surface of the bearing bush.

In accordance with a further feature of the invention, the surfaces may be provided with a radius which is smaller than the radius of the bore of the yoke. In this case, it is advantageous that the surface be arranged in the bore of the yoke since simple production of such a surface is also possible by techniques which do not involve cutting of the material.

Furthermore, in order to insure an embodiment having components which are symmetrical with respect to a basic axis of rotation thereof, it is provided in accordance with a further feature of the invention that the center of the generating radius of the conical surface be arranged on the axis of the trunnions.

To insure elastic deformation which is effective over the entire range of the bending angle of the joint, it is further provided in accordance with the invention that the surface extends over an effective range of the circumference of the bush or bore which is greater than twice the amount of the maximum bending angle of the joint.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
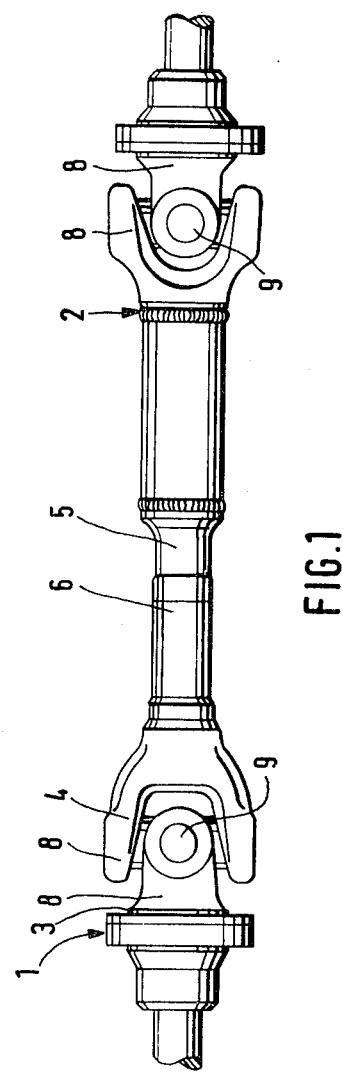
FIG. 1 is a schematic view showing a universal joint shaft assembly having universal joints at opposite ends thereof.

Referring now to the drawings, wherein similar reference numerals are used to refer to like parts throughout the various figures thereof, a universal joint shaft assembly is illustrated in FIG. 1 which comprises two universal joint shaft sections 1 and 2 which carry universal joints 3 and 4 at their ends. The joints 3 and 4 include yoke arms 8 connected through a trunnion cross 9. The universal joint shaft section 1 is constructed as a solid shaft 5 at its inner end and the universal joint shaft section 2 is constructed as a hollow shaft. The solid shaft 5 and the hollow shaft 6 are held so that they will not rotate relative to each other but so as to be axially slideably movable relative to each other by means of a splined shaft connection.

Figure 2:
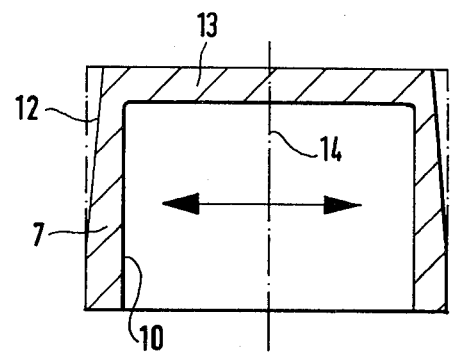
FIG. 2 is a sectional view showing a bearing bush illustrated in detail.
Figure 3:
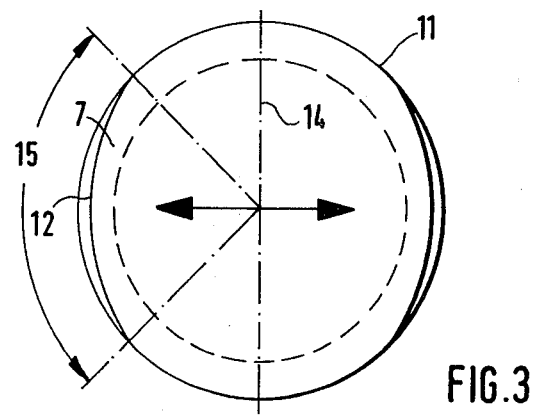
FIG. 3 is a transverse view of the bearing bush shown in FIG. 2.

A bearing bush 7 is illustrated in greater detail in FIGS. 2 and 3. Needles of a needle bearing will role in a cylindrical inner bore 10 of the bearing bush 7 wherein the bearing bush 7 is supported with its outer circumference 11 in the bore of a yoke. A conical surface is provided on the outer surface 11 of the bearing bush 7. This surface commences radially inside and extends radially outwardly in the direction of the bearing bush buttom in the direction toward the plane 14 which contains the centerlines of the trunnions or of the bearing bushes. The surface 12 extends over the circumference of the outer surface 11 in a range which is greater than twice the bending angle of the joint.

Figure 4:
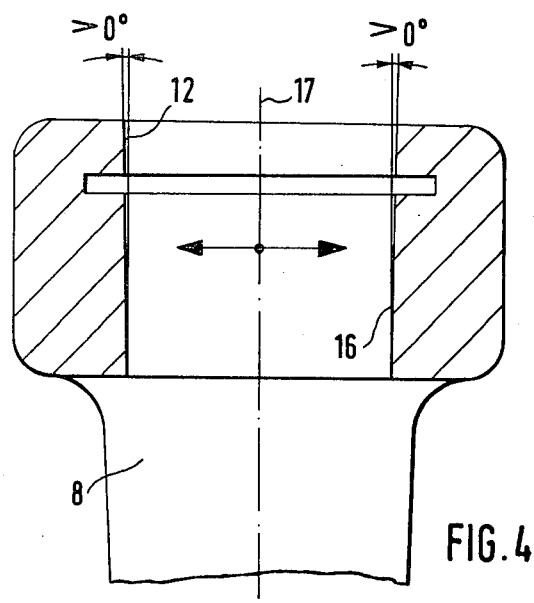
FIG. 4 is a sectional view of a portion of a yoke with a bore.
Figure 5:
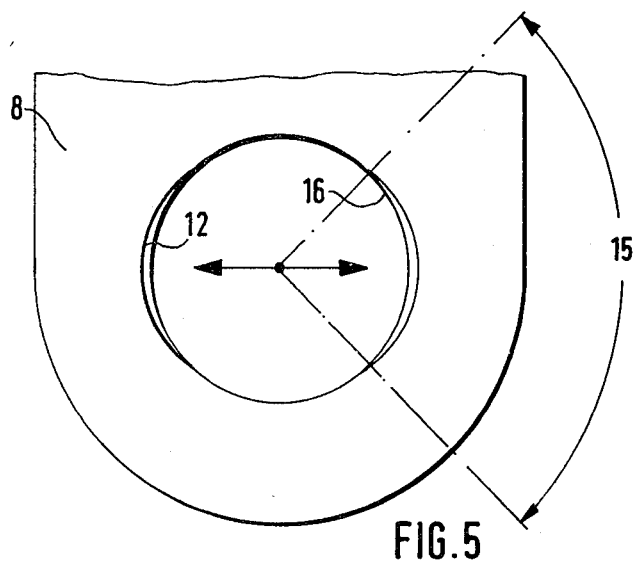
FIG. 5 is a view of the yoke illustrated in FIG. 4.

In FIGS. 4 and 5 there is shown a portion of a yoke arm 10 in which the bore 16 receives the trunnion cross and is formed with a conical surface 12 which extends over a portion of the inner bore 16 of the yoke arm. This surface 12 again extends over a circumferential range 15 which is greater than twice the bending angle of the universal joint. The conical surface 12 extends in the bore 16 from radially inwardly to radially outwardly with the greatest distance of the surface from the centerline 17 being radially outwardly. As a result, it is insured that, under load conditions resulting from torque, the bush will be deformed elastically and that therefore the load on the needle bearing will decrease radially outwardly and the load on the individual needles will be greater at the inside resulting finally in a uniform load on the needle bearing and optimum utilization of bearing capacity.

While specific embodiments of the invention have been shown and described in detail to illustrate the application of the inventive principles, it will be understood that the invention may be embodied otherwise without departing from such principles.

What is claimed is:

1. In a universal joint having trunnion cross means including trunnion means defining a centerline extending centrally therethrough and trunnion cross support means including yoke means defining yoke bore means having inner surface means and bearing bush means having outer surface means received within said inner surface means of the yoke bore means and receiving said trunnion means, the improvement comprising that said trunnion cross support means is formed with conical surface means interfacing between said outer surface means of said bearing bush means and said inner surface means of said yoke bore means, said conical surface means, taken in a direction outwardly from the center of said universal joint, being formed to extend from radially inwardly to radially outwardly relative to a plane containing said centerline of said trunnion means, said conical surface means operating to define a gap between a part of said outer surface means of said bearing bush means and said inner surface means of said yoke bore means, said gap extending over a part of the spherical area and over a part of the axial length of said inner and outer surface means, said gap being enlarged in relation to the center of said joint from radially inwardly to radially outwardly thereof.

2. The improvement according to claim 1 wherein said conical surface means is formed on said bearing bush means.

3. The improvement of claim 1 wherein said conical surface means is formed on a wall defining said yoke bore means.

4. The improvement according to claim 2 wherein said conical surface means is arranged to extend over a portion of the circumference of said bearing bush means, said conical surface means being formed with a greater distance radially inwardly from the centerline of said bush than radially outwardly.

5. The improvement according to claim 3 wherein said conical surface means is arranged on both sides of the circumference of said yoke bore means and wherein said conical surface means is located a greater distance from the center axis of said yoke bore means radially outwardly than radially inwardly.

6. The improvement according to claim 1 wherein said conical surface means comprises two surfaces which are provided to be arranged diametrically opposite each other.

7. The improvement according to claim 2 wherein said conical surface means is formed with a radius which is greater than the radius of the outer surface of said bearing bush means.

8. The improvement according to claim 3 wherein said conical surface means has a radius which is smaller than the radius of said yoke bore means.

9. The improvement according to claim 1 wherein said conical surface means has a center of a generating radius thereof which is arranged on said centerline of said trunnion means.

10. The improvement according to claim 1 wherein said conical surface means is formed to extend over an effective range of the circumference of said trunnion cross support means which is greater than twice the amount of the maximum bending angle of said universal joint.

* * * * *